June 5, 1962 J. P. KLAWITTER 3,037,315
FISH LURE RETRIEVERS
Filed Dec. 7, 1959

INVENTOR.
JOSEPH P. KLAWITTER
BY
Christopher L. Waal
ATTORNEY

United States Patent Office 3,037,315
Patented June 5, 1962

3,037,315
FISH LURE RETRIEVERS
Joseph P. Klawitter, Route 2, Tomahawk, Wis.
Filed Dec. 7, 1959, Ser. No. 857,705
3 Claims. (Cl. 43—42.02)

This invention relates to fishing tackle and more particularly to releasing devices for dislodging fish-hooks from underwater obstructions.

It was heretofore been proposed to release the fish-hook of a fish lure from an underwater obstruction by impact means controlled by a fishing line attached to the lure.

An object of the invention is to provide an improved fish-hook releasing device of the impact type which will enhance the hook-dislodging blow and minimize the impeding or cushioning effect of the water on the hook-releasing action.

Another object is to provide a releasing device of this character which is of simple and inexpensive construction, which is reliable in operation, and which can readily be embodied in a fish lure.

The invention further consists in the several features hereinafter described and claimed.

In the accompanying drawing.

Figure 1:
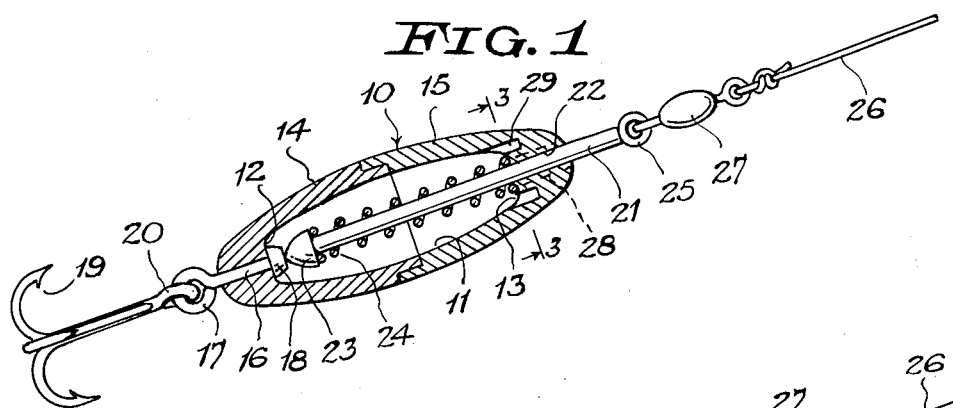
FIG. 1 is a longitudinal sectional view of a fish lure or plug incorporating hook-releasing means of the invention and showing the lure in its normal condition.

In the drawing, 10 designates an elongated hollow body having formed axially therein an elongated chamber 11 with opposite end walls 12 and 13. The body 10 is here shown in the form of a lure body and has a rounded stream-lined shape and a generally circular cross-section. The body is formed of suitable material, such as plastic, and may comprise complementary cup-like sections 14 and 15 having their rim portions suitably secured together, as by cementing.

In one end portion of the lure body is rigidly embedded an axially extending metal stem 16 having a coupling eye 17 at its outer end and a rounded anvil-forming head 18 at its inner end, the head bearing on the end wall 12 of the chamber 11 and having a central impact area. In the form of the invention shown in FIGS. 1 to 3, a multiple-barbed fish-hook 19 has its terminal ring 20 loosely engaged in the coupling eye 17, there being a relatively small amount of axial lost motion between the eye and the ring.

A metal plunger rod 21 of substantial mass extends axially in the body chamber 11 in alignment with the stem 16 and has a portion loosely and slidably projecting through an axial guide bore 22 in the end portion of the body remote from the hook-attaching stem 16. The inner end of the plunger rod has a conical or rounded head 23 which normally bears centrally against the anvil head 18 of the stem 16, the plunger head being substantially smaller in diameter than the diameter of the chamber 11 so as to minimize resistance to the travel of the plunger. The headed plunger is axially urged against the anvil head 18 by a coiled compression spring 24 surrounding the rod, one end of the spring bearing against the rod head 23 and the other end bearing against the end wall 13 of the chamber 11. The outer end of the plunger rod has an eye 25 to which a fishing line 26 is attached, either directly or through an interventing swivel 27. The plunger rod itself may also form a swivel.

When the lure body is submerged, the chamber 11 is more or less filled with water, and a small amount of this water is displaced by the plunger rod in its slidable travel. Water may enter and leave the chamber through the clearance space between the plunger rod and the guide bore 22, or through ports 28, here shown to be formed about the guide bore. One or more bores or air pockets 29 are formed in the rod-guiding end portion of the lure body in communication with the chamber 11 to accommodate the small amount of water displaced by the plunger rod on its inward travel, and the chamber itself may form an air pocket.

Figure 2:
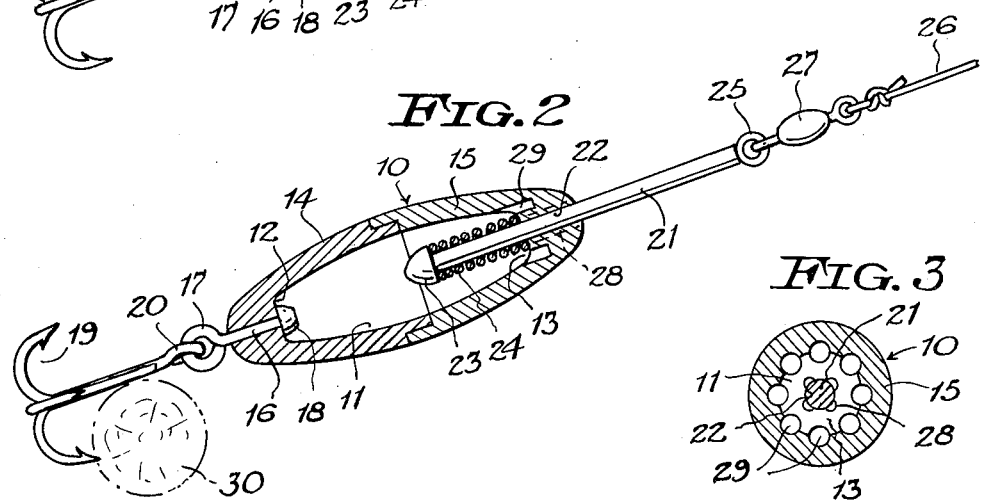
FIG. 2 is a longitudinal sectional view of the lure with the fishing line in tensioned condition ready to provide a hook-releasing impact on a snagged hook.
Figure 3:
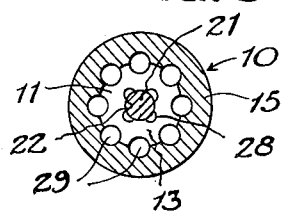
FIG. 3 is a transverse sectional view taken generally on the line 3—3 of FIG. 1.

When the lure is in use, it is towed through the water by the fishing line 26 and by way of example may assume the position seen in FIG. 1. During the travel of the lure, the fish-hook 19 coupled thereto may become accidentally snagged on an underwater obstruction 30, such as a log or branch, as shown in FIG. 2. If this should occur the fisherman applies tension on the fishing line, retracting the plunger rod 21 a substantial distance out of contact with the anvil head 18 and compressing the coiled spring 24, as indicated in FIG. 2. The fisherman then suddenly releases the tension on the line, causing the coiled spring 24 to impel the plunger rod 21 quickly inwardly and effect a central hammer blow on the anvil head 18 of the hook-attaching stem 16, this blow being transmitted longitudinally through the stem to the fish-hook, so as to release the hook from the obstruction. The conical head 23 of the plunger rod offers but little resistance to the rapid spring-urged travel of the plunger in the chamber 11, the diameter of which is substantially larger than the plunger head. During the rapid inward travel of the plunger, the lure body remains substantially stationary in the water, so that the momentum of the spring-urged plunger rod can build up with a minimum of retarding or cushioning action of the water. The streamlined lure body is desirably of relatively light weight, so as to facilitate its hook-dislodging displacement by the plunger rod. Release of the hook permits retrieving of the lure for further use.

Figure 4:
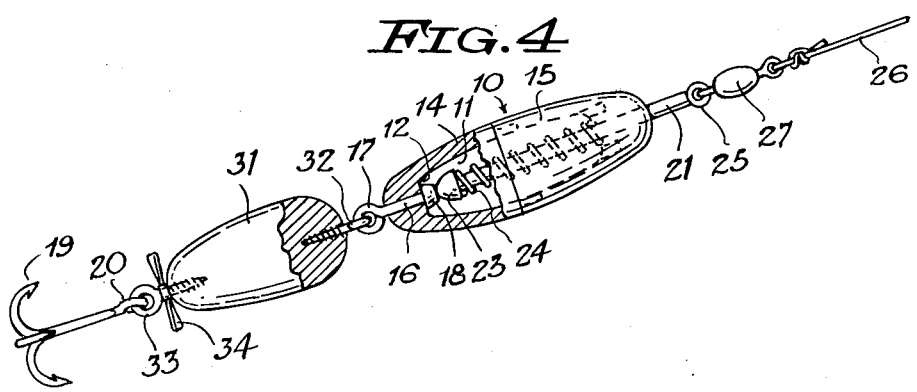
FIG. 4 is a side view of an articulated lure embodying the hook-releasing means, parts being broken away and parts being shown in section.

In the modified form of the invention shown in FIG. 4, the elongated hollow body 10 is connected in endwise relation to an elongated lure body 31 and may form therewith an articulated lure. The lure body 31 is provided at opposite ends with rigidly mounted axially extending coupling eyes 32 and 33, such as screw eyes, the eye 32 being engaged with the eye 17 of the body 10, and the eye 33 being engaged with the terminal eye 20 of a fish-hook 19. If desired, a spinner 34 may be mounted on the hook-attaching screw eye 33, and both of the lure bodies may be suitably colored or ornamented.

In the device of FIG. 4, which is used in the same manner as the device of FIG. 1, the hammer blow produced by the suddenly released spring-urged plunger rod 21 is transmitted axially through the connected coupling eyes 17 and 32, the lure body 31, and the coupling eye 33 to the terminal eye or ring 20 of the fish-hook 19, so as to dislodge the hook from an obstruction.

I claim:

1. A snag releasing fish lure, comprising an elongated hollow body having a chamber therein, a rigid metal coupling member rigidly secured in an end portion of said body in axial relation therein and having an exterior portion and having an inner end portion exposed in said chamber, a plunger rod freely axially slidable in the other end portion of said body and having an inner end normally in axial contact with the inner end of said coupling member, said rod having a line-attaching outer end for connection to a fishing line, a fish-hook directly connected to said exterior portion of the coupling member, and a compressed coiled spring surrounding said plunger rod in said chamber and normally urging said rod inwardly into axial contact with the inner end portion of said coupling member, whereby if the fish-hook becomes snagged on an obstruction a rod-retracting pull on the line and subsequent sudden release of line tension will cause a rapid spring-urged inward travel of the plunger rod to strike an axial blow on the inner end of said coupling member for releasing the hook from the obstruction.

2. A snag releasing fish lure, comprising an elongated hollow body having a chamber therein, a rigid metal coupling stem rigidly secured in an end portion of said body in axial relation therein, said stem having an interior anvil head at an end of said chamber and an exterior portion, a fish-hook directly mounted on said exterior portion of said stem, a plunger rod freely axially slidable in the other end portion of said body and having an inner end normally bearing against said anvil head centrally of said head, said rod having a line-attaching outer end for connection to a fishing line, and a compressed coiled spring surrounding said rod in said chamber and normally urging said rod inwardly into contact with said anvil head, whereby if the fish-hook becomes snagged on an obstruction a rod-retracting pull on the line and subsequent sudden release of line tension will cause a rapid spring-urged inward travel of the plunger rod to strike a blow on said anvil head for releasing the hook from the obstruction.

3. A snag releasing fish lure, comprising an elongated hollow body having a chamber therein and a rigid axial blow-transmitting abutment at an end of said chamber, a rigid coupling member rigidly secured to the end portion of said body axially of said body and projecting outwardly therefrom, a fish-hook directly mounted on the projecting portion of said coupling member, a plunger rod freely axially slidable in the other end portion of said body and having an inner end normally bearing in axial contact against said abutment, said plunger rod having a line-attaching outer end for connection to a fishing line, said chamber including an air pocket for quickly accommodating water displaced by the inward travel of said plunger rod, and a compressed coiled spring surrounding said rod in said chamber and normally urging said rod inwardly against sid abutment, whereby if the fish-hook becomes snagged on an obstruction a rod-retracting pull on the line and a subsequent sudden release of line tension will permit a rapid spring-urged inward travel of said plunger rod into blow-transmitting engagement with said abutment for releasing the hook from the obstruction.

References Cited in the file of this patent
UNITED STATES PATENTS

| | | |
|---|---|---|
| 2,079,335 | Pflueger | May 4, 1937 |
| 2,153,489 | Whitis | Apr. 4, 1939 |
| 2,616,203 | Sarakas | Nov. 4, 1952 |
| 2,739,407 | Godsey | Mar. 27, 1956 |
| 2,892,282 | Rentz | June 30, 1959 |

FOREIGN PATENTS

| | | |
|---|---|---|
| 131,702 | Sweden | May 15, 1951 |